United States Patent [19]
Treiber

[11] 3,992,984
[45] Nov. 23, 1976

[54] STEAM PRESSURE COOKER WITH MANUALLY OPERABLE PRESSURE VENTING

[75] Inventor: Fritz F. Treiber, Dayton, Ohio

[73] Assignee: Hobart Corporation, Troy, Ohio

[22] Filed: Nov. 14, 1975

[21] Appl. No.: 631,829

[52] U.S. Cl. ............................... 99/330; 126/20; 126/369; 426/511
[51] Int. Cl.² .................................... A47J 27/04
[58] Field of Search ............... 99/330, 325–326, 99/327–328, 329, 331–332, 333, 351–469, 483; 126/20, 369; 426/232, 511

[56] References Cited
UNITED STATES PATENTS

| | | | |
|---|---|---|---|
| 2,605,969 | 8/1952 | Sanders | 99/330 X |
| 3,071,063 | 1/1963 | Churley | 99/332 |
| 3,071,473 | 1/1963 | Churley | 126/20 X |
| 3,393,628 | 7/1968 | Vischer, Jr. | 99/330 |
| 3,431,902 | 3/1969 | Vischer, Jr. | 99/332 X |
| 3,604,334 | 9/1971 | Ballentine | 99/483 |
| 3,639,725 | 2/1972 | Maniscalco | 219/401 |
| 3,744,474 | 7/1973 | Shaw | 99/330 X |
| 3,790,391 | 2/1974 | Bolleter et al. | 99/332 X |
| 3,818,819 | 6/1974 | Shulz et al. | 126/369 X |
| 3,951,131 | 4/1976 | Houfek | 99/330 X |

*Primary Examiner*—Edward L. Roberts
*Assistant Examiner*—Arthur O. Henderson
*Attorney, Agent, or Firm*—Biebel, French & Nauman

[57] ABSTRACT

A steam pressure cooker is provided with a normally open drain valve connected to the bottom of the cooker pressure vessel and having a relatively large flow capacity to drain liquids and food particles. A separate exhaust pipe of restricted capacity is also connected to the vessel and controlled by a separate valve. Steam is supplied to the pressure vessel through an inlet source, and with the drain valve closed the restricted exhaust pipe allows pressure to rise in the vessel since flow through the restricted pipe is less than the inlet flow. Controls are provided for closing the main drain valve and the restricted exhaust pipe separately, in sequence, and these controls include a manually operable device which can be used to open the restricted exhaust pipe to depressurize the vessel independently of the automatic control of the cooker.

5 Claims, 1 Drawing Figure

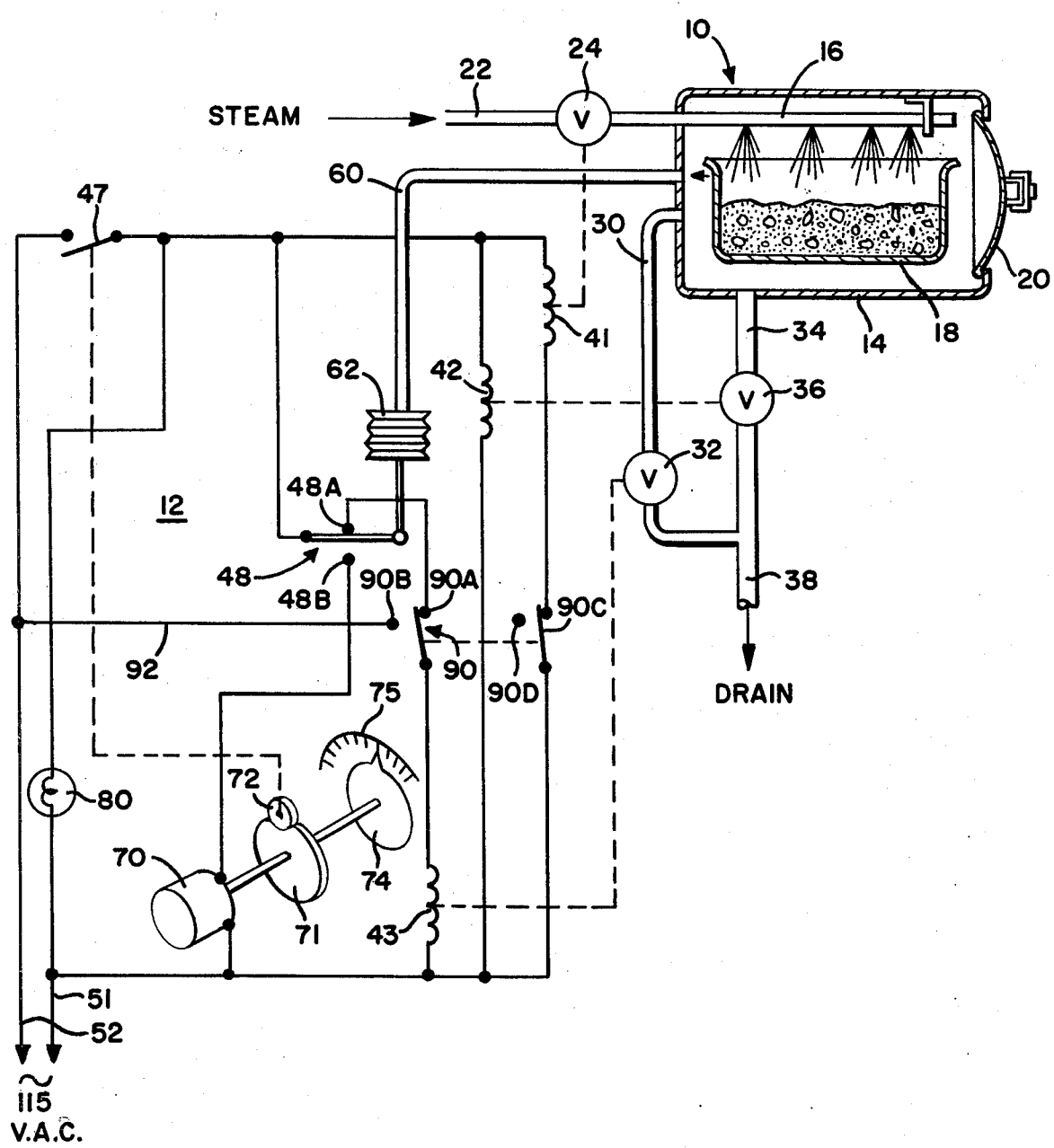

STEAM PRESSURE COOKER WITH MANUALLY OPERABLE PRESSURE VENTING

CROSS-REFERENCE TO RELATED APPLICATIONS

This invention is related to copending U.S. patent application Ser. No. 514,021 filed Oct. 11, 1974 now U.S. Pat. No. 3,951,134 issued Apr. 20, 1976, entitled "Pressure Vessel with Multiple Outlet Connections and Improved Control Method", and assigned to the assignee of this application.

BACKGROUND OF THE INVENTION

This invention relates generally to steam pressure cookers or the like particularly to an improved drain and venting system therefor.

Steam or pressure-type cookers have been successfully employed by restaurants, hospitals and other food service operations to prepare quickly and conveniently large quantities of food. They are especially convenient for the preparation of frozen foods, and in such use incorporate a defrosting step as an initial part of the cooking process. Typical such steam cookers are illustrated by Churley U.S. Pats. No. 3,071,063 and No. 3,071,473. Such cookers subject the food placed in trays in the cooker vessel to jets of steam which may impinge directly upon the food in an atmosphere above atmospheric pressure, thus thawing and cooking the food rapidly.

Typically, the drain system for prior art steam cookers has consisted of a drain pipe located in the bottom of the pressure treatment vessel and fitted with a solenoid operated drain valve. The pipe can empty into an open bell fitting which is connected with the building waste system. The drain pipe, or the drain valve, has a predetermined relatively small flow capacity, correlated to the flow capacity of the steam inlet to the vessel. Once food in the cooker is thawed (defrosted), the rate of steam condensation in the vessel slows noticeably and, as a result of the limited drain capacity, pressure (and temperature) in the cooker begins to rise. The rise in pressure or temperature is sensed by an appropriate sensor device, and the drain valve is closed in response thereto. Thus, since termination of the defrosting cycle and commencement of the cooking cycle depends upon pressure buildup (or temperature rise) the drain pipe and drain valve are necessarily of a size small enough to restrict steam outflow and allow the pressure to build in the vessel at the end of the defrost cycle.

In using a cooker of this type it is found that food particles may fall from a cooking pan in the cooker and be carried into the drain with exhausting steam, particularly at the end of a cooking cycle, and these particles can clog the relatively small drain pipe and valve. As a result, a clogged drain may render the cooker inoperative, since the defrost cycle is prevented from operating properly. Therefore, prior art drain systems must be periodically disassembled, checked and cleaned of food particles that could plug the drain system, particularly the drain valve.

Inclusion of an additional drain valve, e.g., as shown in U.S. Pat. No. 3,804,591 to Bezrodny et al, will not provide a solution for this possibility. The autoclave shown in the Bezrodny patent has a single regulated exhaust with two control valves in series in the exhaust to control pressure in the autoclave, and a water drain valve in the bottom of the autoclave. Although the size and use of the water drain valve are not specified in the Bezrodny patent, it is apparent that these elements are used only after the autoclave has cooled and depressurized. In a food service operation such a long period for depressurization and cool down would be a disadvantage since quick and convenient operation is desired.

The use of multiple pressure vessel outlet lines, such as a defrost line and a drain line, along with appropriate solenoid operated valves and control circuitry, is disclosed in the aforementioned related application, and provides a generally satisfactory solution to the problem of removal of food particles from the cooker without interfering with or preventing the operation of a restricted flow means which allows the cooker to operate with a defrost cycle. However, such an arrangement does not provide for interruption once the cycle has begun. If, for some unknown reason, the bottom drain becomes blocked, or the valve malfunctions, there will be no effective draining from the cooker, and it generally cannot be opened immediately.

A cooker with a blocked drain is inconvenient, but is not necessarily unsafe since it will in a reasonable time cool and depressurize as steam in the cooker condenses. The cooker however, will upon cool down remain under slowly decreasing out pressure so that the door will be openable only by prying an edge from its seal to release pressure. As can be appreciated, such a situation is inconvenient and the cooker, especially the door or its seal, can be damaged by the use of a prying instrument.

In some cooker use situations it is desirable to interrupt the cooking cycle temporarily in order to, for example, add or remove food having different cooking time. Although depressurization and door opening in this instance could be accomplished by cancelling the time remaining on the timer followed by resetting the timer after the cooker has been reclosed, it is desirable that some means independent of the timer be provided for such occasions.

SUMMARY OF THE INVENTION

The steam cooker of the present invention incorporates two pressure vessel outlet lines, each having a solenoid operated valve controlling the flow of steam and fluid therethrough, and with the valve solenoids incorporated in a cooker control circuit as generally disclosed in the aforementioned related application. In addition, a separate control independent of the control circuit, is provided to open the defrost outlet line and depressurize the cooker in the event the drain valve is blocked or when the cooking cycle is to be interrupted.

The steam cooker of the invention comprises a pressure vessel having an inlet to be connected to a source of steam under pressure, a first outlet line (a defrost or vent line) which connects with the vessel at a point well above the bottom, a second outlet or drain line which connects with the bottom of the vessel, and a depressurization control means. The inlet and outlet lines include solenoid operated valves operated by a cooker control circuit to produce the preheat, defrost and cooking sequence. The depressurization control means is basically a switch arrangement, independent of the control circuit, which allows the defrost line to be opened and the steam supply to the pressure vessel terminated regardless of the timer condition. When the drain line or valve becomes clogged, or when a shorter cycle is desired, the independent depressurization control means allows for immediate depressurizing of the vessel.

In a typical operation of a cooker embodying the present invention, a timer in the cooker control circuit is set to the desired cooking time and closes a switch which in turn closes the drain valve while opening the steam supply and defrost valves. Steam enters the vessel to begin the preheat/defrost part of the cycle. Once the food is heated or defrosted, pressure in the vessel begins to rise, and at a vessel pressure between about three and five pounds per square inch a pressure switch is activated which causes the defrost valve to close and starts the timer motor to begin the cooking phase of the cycle. Once the timer expires, the cooking phase is ended, the timer switch opens, closing the steam inlet valve, opening the drain valve and commencing vessel depressurization. At this time any food particles, as well as liquids, which may have accumulated in the bottom of the vessel, will tend to be forcefully carried into the bottom drain and through the drain valve with exhausting steam. Once the vessel is depressurized, the door can be opened and the cooked food removed.

If the drain valve should become fouled with food particles or for any other reason fails to open upon timer expiration, the depressurization control means can be manually activated to energize and open the closed defrost valve, and quickly depressurize the vessel, which can then be opened, unloaded, and the drain cleared of any fouling material. The depressurization control means can also be activated during timer operation to shorten a cooking cycle by overriding the timer control. The depressurization control means can be arranged to open the electrical circuit controlling the steam inlet valve thereby allowing the normally closed steam supply valve to close while steam is released from the vessel in an interrupted cycle.

It is therefore an object of the invention to provide an independent depressurization control means for steam pressure cookers which will allow the cooker to operate essentially automatically, including preheating/defrosting and cooking phases of a total cycle, while being able to depressurize the vessel if the drain becomes clogged, or it becomes desirable to have the cooking cycle interrupted.

Other objects and advantages of the invention will be apparent from the following description, the accompanying drawing and the appended claims.

BRIEF DESCRIPTION OF THE DRAWING

The single FIGURE of the drawing is a schematic diagram of a steam pressure cooker and its control system embodying the principles of the present invention.

DETAILED DESCRIPTION OF THE INVENTION

As shown in the drawing, the steam pressure cooking apparatus includes an autoclave type unit 10 and a cooker control circuit 12. Autoclave 10 includes a pressure treatment vessel 14, a steam injector pipe 16 having a plurality of openings, an open top food container 18, and a vessel door 20 for sealing vessel 14 after food has been placed therein. Vessel 14 is a structure which is conventional in the art and normally comprises a cylinder which is closed at one end and which has at its other end an inwardly extending annular flange into which door 20 fits. A pressure and/or temperature gage (not shown) can be attached to vessel 14 if desired to enable conditions in the vessel to be monitored during cooker use.

Steam for heating food in the vessel 14 is supplied to pipe 16 from a conventional source such as a steam generator (not shown) by pipe 22. Steam flow is controlled either by a solenoid operated inlet valve 24 which is preferably of the normally closed type or by such means as terminating steam generating in the case of a small steam generator. Normally, the steam supplied to the valve 24 will be passed through a steam strainer and/or separator apparatus (not shown). The steam as supplied to the cooker is preferably clean, dry and at a pressure of about 15 psig.

Two outlet connections are employed for the pressure vessel. The first outlet can be an independent connection to the vessel or can be the defrost pipe or vent line 30, which is identified in the above-referenced application. This line has a normally closed solenoid valve 32 therein. The vent line 30 enters a wall of the vessel, as opposed to the bottom so that food particles are unlikely to enter the vent during cooker operation or venting to the drain. A second and substantially larger outlet connection is provided through the drain pipe 34 which connects with the bottom of vessel 14. Flow through the drain pipe 34 is controlled by the solenoid operated drain valve 36 which is preferably a normally open valve. The two pipes 30 and 34 may be joined downstream of the valves, as at 38, so that they may empty into a common line.

Pipe 34 and valve 36 have substantially larger passages than pipe 30, to the extent that the vessel drain normally will pass food particles and/or liquids without becoming blocked or clogged. The vent pipe and valve 30 are small enough that they will restrict steam exhaust and cause pressure vessel 14 to build up at the end of the defrost phase of the total cooking cycle. The sizing and selection of pipes and valves are disclosed in more detail in the above-identified related application, the disclosure of which is hereby incorporated by reference.

During normal cooker operation the control circuit means provides for automatic opening and closing of valves 24, 32 and 36 in the proper sequence and leaves these valves open or closed for selectable or prearranged periods, so that defrosting, cooking, venting and purging of the cooker may progress automatically.

In the preferred embodiment, valves 24 and 32 are normally closed solenoid operated valves, and valve 36 is a normally open solenoid operated valve. Use of a normally closed steam supply valve and a normally open drain valve permits the cooker to remain in a non-energized state with the chamber continuously drained during periods of disuse, such as overnight and over weekends.

The use of two cooker outlet connections with a normally open drain valve in addition to providing desirable assurance that the cooker is not likely to become inoperative with the vessel under steam pressure and the drainage system clogged or jammed in the closed condition also allows temporary use of a cooker having a clogged or jammed drain valve until a serviceman becomes available to return the cooker to normal operation. During such use, vessel pressure is relieved by the vent line 30 through operation of the pressure relief means while collected water and food particles are removed manually from the cooker bottom.

The operation of solenoid coils 41 and 42 on valves 24 and 36, respectively, is controlled solely by timer switch 47, while the solenoid coil 43 for vent valve 32 is controlled by both the timer switch 47 and a pressure controlled switch 48. The power supply for the circuit is indicated by lines 50 and 51.

A pressure connection 60 extends from the interior of the vessel 14 to a pressure responsive device such as a diaphragm or bellows 62 which operates pressure controlled switch 48. The switch 48 will normally be set to transfer its contacts between approximately 3.0 and 5.0 psig, preferably the lower valve. A temperature sensor could be substituted for the pressure sensor because of the relation between pressure and temperature in the vessel 14.

Switch 47 is part of a timer mechanism which includes motor 70, cam 71 driven thereby, and cam follower 72. The cam 71 is shown rotated to its off position with follower 72 holding switch 47 open. A manually operable dial and knob 74, associated with a graduated scale 75, is used to preset the cam 71 to any desired period of cooker operation.

To start a cooking operation, the food to be cooked, usually frozen and carried in an open tray 18, is placed in cooker 10. The operator then sets the timer dial to the desired time period position on the scale 75, thereby closing normally open switch 47.

Closing switch 47 energizes the solenoid coils 41 and 42 causing steam valve 24 to open and drain valve 36 to close. Also, pilot light 80 is energized indicating that the timer has been set and the cooker is operating. Immediately after closing switch 47, switch 48 is in the position shown, completing a circuit through contact 48A. Solenoid coil 43 is thus energized causing vent valve 32 to open.

Once steam enters the vessel 14 through open valve 24, it comes in contact with the relatively cool or frozen food, and is rapidly condensed thereby transferring its latent heat of condensation to the food. Some of the steam carries air from the vessel 14 and spaces between the particles of food and passes out of the vessel by way of vent pipe 30. As steam continues to enter the vessel 14, food in the pan is quickly defrosted if frozen, or pre-heated if already above freezing temperature, with the steam penetrating the food mass so that it is completely heated. As the food temperature increases the rate of steam condensation slows, and pressure in vessel 14 begins to increase as non-condensed steam accumulates in the vessel.

The opening in valve 32 forms an orifice having an area that is limited in relation to the rate of steam supply, such that pressure on the interior of vessel 14 does not appreciably increase until the rate of steam condensation slows appreciably.

When the vessel pressure reaches a predetermined value, normally about 3.0 pounds per square inch, the bellows 62, operating through a snap action mechanism (not shown), transfers the movable arm of switch 48 from contact 48A to contact 48B. This deenergizes solenoid coil 43, closing the vent valve 32. The interior of the vessel 14 thus becomes subjected to the full steam supply pressure and the cooking cycle proceeds. Closing of contact 48B causes power to be applied to the timer motor 70 so that the cam 70 rotates until follower 72 opens switch 47. This deenergizes solenoid coils 41 and 42, the steam supply valve 24 is closed, and the drain valve 36 is opened. The steam in the vessel 14 at this time plus any food particles and the liquid collected in the bottom of the vessel 14, are urged toward the drain pipe 34, and the valve 36 to the drain. The outflow of steam tends to entrain this liquid and particles in the exhausting flow, and thereby purges both the vessel and the drain system.

If for some unplanned reason the drain 34 or the valve 36 become clogged or blocked, or the drain valve 36 becomes stuck in the closed position, deenergizing of solenoid 42 will not open the drain line 34 making the cooker essentially inoperative. In this event the cooker will cool down and in from about four to sixteen minutes will reach a pressure which is sufficiently low that the door can be opened. In many cooker uses this cool down period is excessively long so that it is desirable to provide means to release the pressure immediately.

Immediate pressure release in addition to allowing continued makeshift cooking use of the cooker also allows saving and use of the food being cooked when the drain malfunction occurred (the four to sixteen minute overcook during a pressurized cooker cool down precluding such use in most instances) and also provides a servicing tool which precludes the serviceman having to wait four to sixteen minutes after testing a cooker having a malfunctioning drain system.

Thus, to allow the cooker to be purged and/or operated on a temporary basis, a means is provided in the form of a double pole double throw switch 90 which is operative manually to open the valve 32 and depressurize the cooker 14 during the term of the timer. In its normal position switch 90 closes contact 90A and completes the circuit between the contact 48A and solenoid 43, so that during the cook cycle, vent valve solenoid 43 will be controlled by the cooker control circuit.

Upon activation of the depressurization switch 90, contact 90A is opened and contact 90B is closed, to form a direct connection via line 92 to the power line 50. Closing of contact 90B supplies power directly to solenoid 43 and opens the defrost or vent valve 32, allowing vessel 14 to be depressurized. The door 20 can then be opened and the cooked food removed. Since drain valve 36 is closed during the duration of the cooking cycle, if it becomes inoperative, this permits temporary use of the cooker until it can be repaired.

Because it is connected directly to power line 50, depressurization switch means 90 can be operated independently of the status of the cycle of the cooker control circuit. Thus, the depressurization switch 90 can be used to shorten or interrupt the cycle of operation of the cooker, such as when the cooker has been set for a 30 minute meat cooking cycle and a vegetable requiring five minutes of cooking is to be added or removed. For use in the cycle interrupting instance, the depressurization switch means 90 also includes an optional second switch having contacts 90C and 90D, the contact 90C having connected between solenoid 41 and the power source, such that the steam inlet valve 24 will be closed and the steam supply cut off when the vent valve 32 is opened for depressurization. Closing the steam supply valve 24 as accomplished by the contacts 90C is, of course, desirable during depressurizing in order that the limited flow possible through valve 32 be sufficient to reduce vessel pressure to a level permitting door opening. As explained above, valves 24 and 32 are selected such that some pressure, i.e., three to five psig during defrost, is present in vessel 14 when both valves 24 and 32 are in the open condition; with a door 20 of large surface area (commonly one square foot or more) a pressure of any significant magnitude would prevent door opening until the steam supply is terminated. Closing valve 24 and terminating the steam supply during depressurization operation of the cooker is also desirable in order that new steam not be wasted or present an operator hazard in passing from the pipe 16 into the cooker and out into the kitchen while the cooker door is open in the depressurizing mode.

The switch 90 may, of course, be physically mounted on the cooker control panel or may alternately be placed in a remote cooker location for access when needed.

While the form of apparatus herein described constitutes a preferred embodiment of this invention, it is to be understood that the invention is not limited to this precise form of apparatus, and that changes may be made therein without departing from the scope of the invention.

What is claimed is:

1. In a steam pressure cooker including a closed pressure vessel; an inlet connected to a source of pressurized steam; an exhaust and drain system including a drain pipe connected to the bottom of said vessel and having a valve therein through which is drained liquids and/or food particles, a separate restricted exhaust pipe connected to said vessel and having a separate valve therein; and automatic control means controlling said valves to regulate flow of steam into and out of said vessel whereby foods can be automatically defrosted, preheated, and cooked,
   the improvement in said exhaust and drain system comprising:
   manually operable means independent of said control means and connected to open said restricted exhaust means whereby said cooker can be depressurized independently of the status of said automatic control means.

2. A cooker as in claim 1 wherein said inlet also has a valve therein, and said manually operable means is also connected to close said inlet valve as part of the manually initiated depressurizing of said vessel.

3. A steam pressure cooker comprising:
   a pressure cooking vessel,
   an inlet connected to said vessel from a source of steam under pressure,
   a power operated normally closed inlet control valve in said inlet,
   a drain pipe connected to the bottom of said vessel to exhaust steam along with collected condensate and/or food particles,
   a power operated normally open drain control valve in said drain pipe,
   a defrost outlet pipe also connected to said vessel providing a separate exhaust for steam,
   a power operated normally closed defrost control valve in said defrost pipe,
   said defrost pipe and defrost control valve providing a restricted steam exhaust outlet correlated to said inlet whereby internal pressure will increase in said vessel when steam is admitted through said inlet with said drain valve closed and said defrost valve opens and steam no longer is condensing significantly within said vessel,
   a cycle control circuit connected to said inlet valve, said drain valve, and said defrost valve including a timer operative to open said inlet valve and said defrost valve and close said drain valve,
   condition responsive means incorporated in said control circuit and responding to conditions indicating the end of steam condensation at the initial phase of a cycle and operative to close said defrost valve, and start said timer motor and
   manually operable means connected to open said defrost valve independently of the status of said timer thereby depressurizing said cooking vessel.

4. A cooker as in claim 3 wherein said manually operable means is also connected to close said inlet valve and to stop the further flow of steam into said vessel.

5. In a steam cooker which includes a closable vessel; a vessel drain system connected between the vessel bottom and a waste line, the drain system including a drain valve; a source of steam, including steam flow control means, connected with the vessel; and automatic sequential means controlling said steam flow control means and said drain valve to establish heating cooking and access conditions in said vessel;
   the improvement in said drain system comprising:
   means connecting said vessel with said waste line independently of said drain valve and said automatic sequential means and responsive to a manual act;
   means responsive to said manual act for terminating the flow of steam to said vessel independently of said automatic sequential means;
   the steam-relieved vessel being immediately accessible for manual operations therein and without regard for or interruption of said automatic sequential means.

* * * * *